No. 861,439.
PATENTED JULY 30, 1907.
J. M. DAVIDSON.
APPARATUS FOR WELDING TAPERED TUBES.
APPLICATION FILED FEB. 5, 1906.
2 SHEETS—SHEET 1.
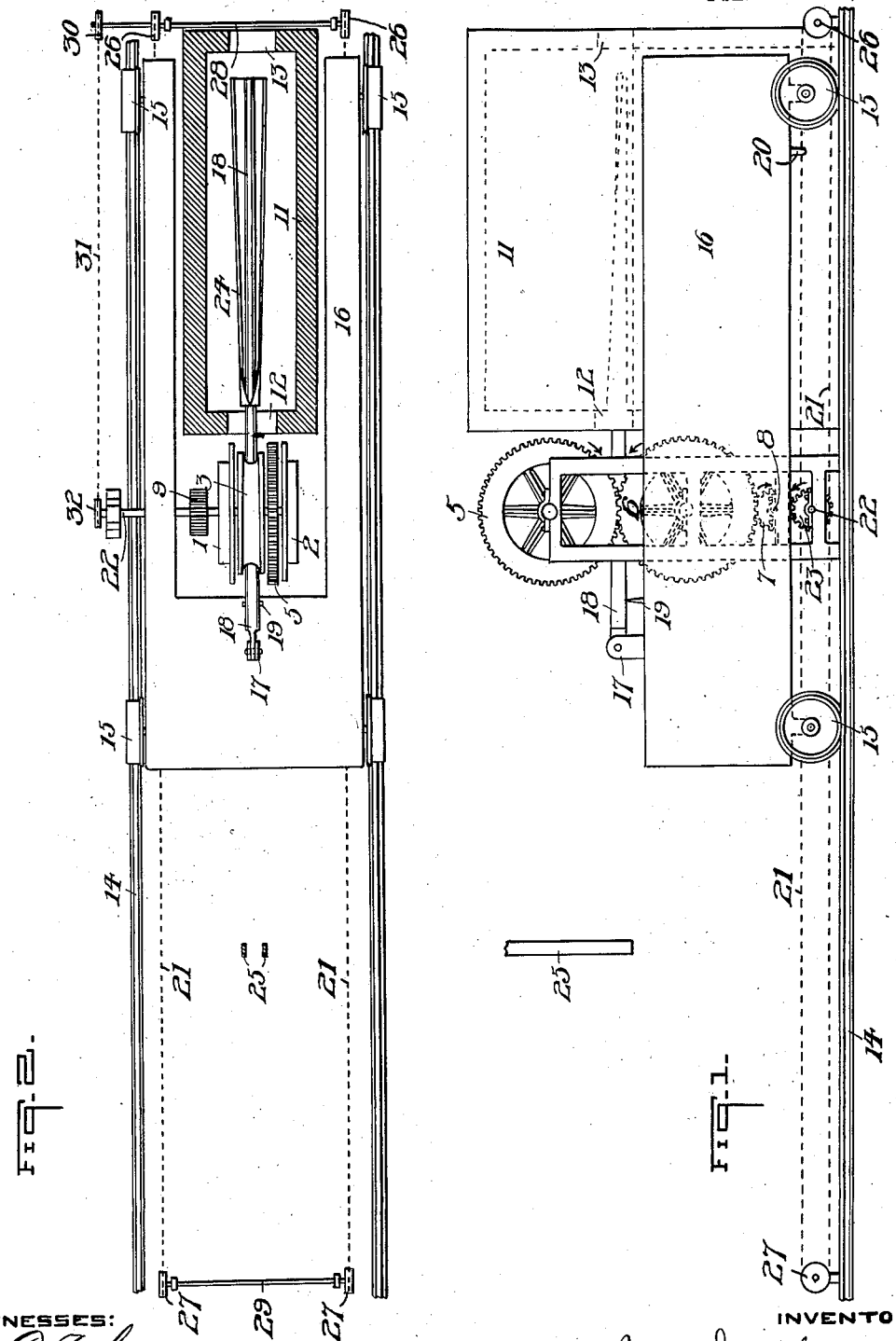
WITNESSES:
INVENTOR
J. M. Davidson,
by Pierce & Barber,
ATTORNEYS No. 861,439. PATENTED JULY 30, 1907.
J. M. DAVIDSON.
APPARATUS FOR WELDING TAPERED TUBES.
APPLICATION FILED FEB. 5, 1906.
2 SHEETS—SHEET 2.
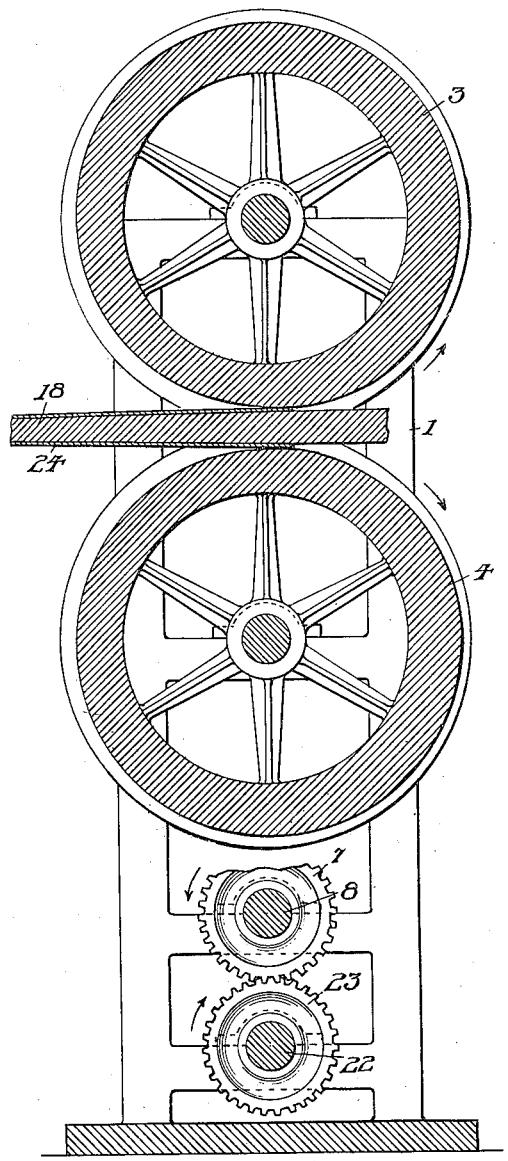
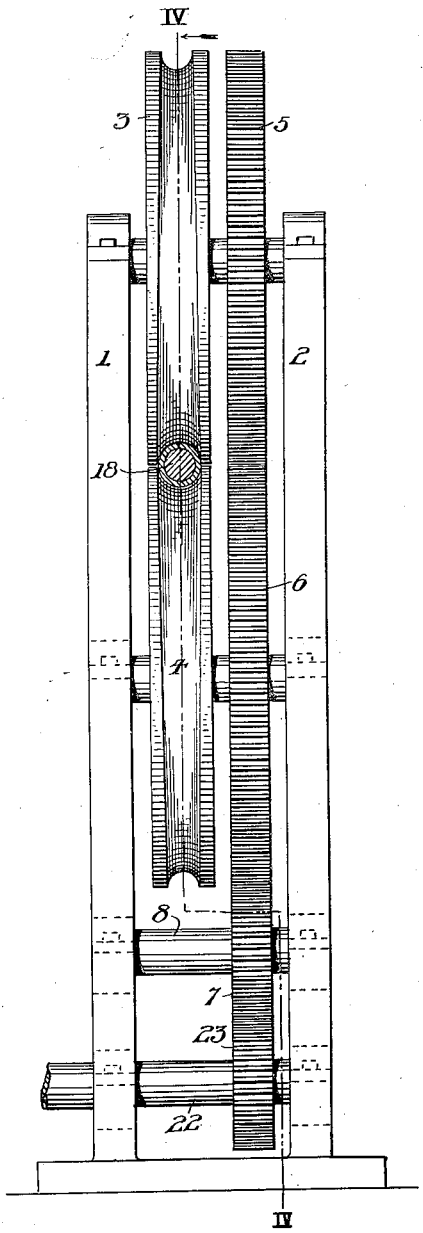
WITNESSES:
INVENTOR
J. M. Davidson,
by Pierce & Barber
ATTORNEYS

UNITED STATES PATENT OFFICE.

JOHN M. DAVIDSON, OF PITTSBURG, PENNSYLVANIA, ASSIGNOR OF ONE-FOURTH TO EDWARD D. FROHMAN AND CHARLES I. AARON, OF PITTSBURG, PENNSYLVANIA.

APPARATUS FOR WELDING TAPERED TUBES.

No. 861,439.     Specification of Letters Patent.     Patented July 30, 1907.

Application filed February 5, 1906. Serial No. 299,395

*To all whom it may concern:*

Be it known that I, JOHN M. DAVIDSON, a citizen of the United States, residing at Pittsburg, in the county of Allegheny and State of Pennsylvania, have invented new and useful Improvements in Apparatus for Welding Tapered Tubes, of which the following is a specification.

My invention relates to apparatus for welding tapered tubes, such, for example, as are used for trolley poles and supports for electric lights.

It is the object of my invention to present an apparatus whereby properly shaped skelp may be welded into tapered tubes. Preferably a flat tapered skelp of the desired length and lateral dimensions is preliminarily curved to form a trough on a radius slightly larger than the larger end of the tubes when welded or to form a tapered shape with its opposite edges standing slightly apart so that they may be properly brought to a welding heat. It is immaterial to my invention what the particular cross-section of the skelp is, provided it can be used with the apparatus which my claims cover. After the skelp has been properly heated, a mandrel is inserted into it and the same are passed between welding rolls, whereby the edges of the tube are brought together and welded.

My invention also resides in certain details, hereinafter to be described.

Referring to the drawings which are an expression of one form only which my invention may assume, Figure 1 is a side elevation; Fig. 2, a plan with the furnace in horizontal section; Fig. 3, an end elevation with the pipe and mandrel in section; Fig. 4, a section on the line 4—4 of Fig. 3; Fig. 5, a cross-section of the mandrel and the skelp thereon; and Fig. 6, a cross-section of the mandrel and the welded tube thereon.

On the drawings, 1 and 2 represent a pair of housings supporting a pair of welding rolls or wheels 3 and 4, one above the other and of equal diameter. The necks of these rolls are provided with intergeared wheels 5 and 6 which prevent one roll from rotating independently of the other. The peripheries of the rolls are provided with tapered recesses whose length is at least equal to the length of the tubes to be made and whose cross-section at all points along its length is approximately equal to half that of the finished tube. The deepest portions of the two recesses are matched so as to form a circle having the diameter of the large end of the tubes, and the remainder of the two recesses extends in the same direction so that as the rolls are rotated there will be between them a round opening. If the peripheries of the rolls were developed and their grooves were matched, there would be formed a tapered hole having the shape and size of the finished tubes.

The wheel 6 is driven by the pinion 7 on the shaft 8, on which is the driving gear 9.

11 represents a welding furnace of any preferred construction, in which the skelps are heated, the furnace having the withdrawing opening 12 opposite the pass between the rolls. The rear end of the furnace has an opening 13, through which the skelp is charged and a pusher inserted, if necessary, to push the skelp to the rolls.

At the sides of the housings and the furnace are the rails 14, on which the wheels 15 of the carriage or bed 16 run. This bed has its forward end divided so that one portion passes to the right, and the other to the left of the furnace as shown on Fig. 2.

On the bed 16 is a post 17 in line with the roll pass and has pivoted thereon the tapered mandrel 18 held in horizontal position or in line with the roll pass by being supported on the lug 19 on the bed between the post 17 and the rolls.

The bottom of the bed 26 is preferably provided with lugs 20 (only one shown), to which is secured the ends of the sprocket or driving chains 21. The sprocket chains pass over sprocket wheels 26 and 27 on the shafts 28 and 29, respectively. The shaft 28 has thereon the sprocket wheel 30 connected by the chain 31 to the sprocket wheel 32 on the shaft 22, but other mechanism may be used.

The operation is as follows: The skelp is placed in the furnace 11, through the opening 13. When the edges to be welded together have been brought to a welding heat, the shaft 8 is rotated by any suitable power to cause the bed 16 to travel to the rear. During this travel the mandrel moves through the pass between the rolls and into the furnace and into the heated skelp 24 which has been previously bent as above described or as shown in Fig. 5. The mandrel is preferably moved with its small end forward, and during this movement the rolls also rotate so that when the mandrel has reached the end of its forward travel, the deepest or largest portions of the grooves or die surfaces in the rolls are next to the furnace. The shaft 8 is now reversed and the mandrel with the skelp thereon is drawn out of the furnace and through the rolls, the latter pressing the edges of the skelp together to form a welded joint. The mandrel forms a support or anvil to resist the pressure of the rolls and hold the tube rigidly in place to produce a good weld. The tube will be welded progressively from end to end and the pressure of the rolls will act on the skelp before it can become appreciably cooled, as the rolls and the furnace are placed close together. If necessary the skelp may be held on the mandrel until it is in the bite of the rolls, by a pusher such as are used with lap-weld rolls, or otherwise. The welding rolls will press the edges of the skelp together as shown in Fig. 6.

In order to strip the welded tube from the mandrel, a pair of fingers 25 are fixed above the bed 16 and at a sufficient distance apart to permit the mandrel to pass between them, and to engage with the end of the tube as the bed moves back after the welding has been completed. The lugs 20 are preferably located so as to be as near as possible to the forward end of the bed 16 so as to give the bed the longest travel possible during the welding operation. This arrangement allows the mandrel to pass the stripping fingers 25 so as to permit the welded tube to drop or be removed with a much shorter bed than would be the case if the lugs were at the opposite end of the bed. The number of chains 21 is not material.

I do not limit myself to the use of my apparatus for tapered tubes, unless the art requires such a limitation. Nor do I limit myself to a furnace as shown, as the tubes may have their edges brought to a welding heat by electric heaters prior to their entry into the rolls. In this case the mandrel may be cooled, if necessary, by an internal circulation of a cooling fluid or otherwise to prevent the tube being welded to the mandrel.

The mandrel may be covered with graphite or other protective material, if desired.

I claim—

In an apparatus for welding tubes, a welding furnace, welding rolls in front of the furnace, a mandrel in front of the rolls, a carriage for the mandrel, and means for advancing the mandrel between the rolls and into the furnace, and withdrawing the same from the furnace and between the rolls.

Signed at Pittsburg, Pa., this 17th day of January 1906.

JOHN M. DAVIDSON.

Witnesses:
F. N. BARBER,
CARRIE E. EGGERS.